US012283448B2

(12) United States Patent
Jeong

(10) Patent No.: US 12,283,448 B2
(45) Date of Patent: Apr. 22, 2025

(54) MICRO FOCUS X-RAY TUBE USING NANO ELECTRIC FIELD EMITTER

(71) Applicant: ELECTRONICS AND TELECOMMUNICATIONS RESEARCH INSTITUTE, Daejeon (KR)

(72) Inventor: Jin-Woo Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 334 days.

(21) Appl. No.: 18/086,845

(22) Filed: Dec. 22, 2022

(65) Prior Publication Data

US 2023/0223230 A1 Jul. 13, 2023

(30) Foreign Application Priority Data

Jan. 12, 2022 (KR) ........................ 10-2022-0004632
Oct. 6, 2022 (KR) ........................ 10-2022-0128048

(51) Int. Cl.
*H01J 35/14* (2006.01)
*H01J 35/06* (2006.01)

(52) U.S. Cl.
CPC ............ *H01J 35/14* (2013.01); *H01J 35/065* (2013.01)

(58) Field of Classification Search
CPC .... H01J 35/14; H01J 35/065; H01J 2235/083; H01J 2235/18; H01J 35/16; H01J 35/147; H01J 35/064; H01J 35/08
See application file for complete search history.

(56) References Cited

U.S. PATENT DOCUMENTS

| | | | | |
|---|---|---|---|---|
| 9,042,520 | B2 | 5/2015 | Jeong et al. | |
| 9,048,059 | B2 | 6/2015 | Jeong et al. | |
| 2011/0116603 | A1 | 5/2011 | Kim et al. | |
| 2011/0188635 | A1* | 8/2011 | Cho ...................... | H01J 35/066 977/939 |
| 2020/0144016 | A1 | 5/2020 | Kim et al. | |

FOREIGN PATENT DOCUMENTS

| | | | |
|---|---|---|---|
| JP | 2013-109937 | A | 6/2013 |
| JP | 2019-186093 | A | 10/2019 |
| KR | 10-2008-0052552 | A | 6/2008 |
| KR | 10-1250305 | B1 | 4/2013 |
| KR | 10-1289502 | B1 | 7/2013 |
| KR | 10-1737399 | B1 | 5/2017 |
| KR | 10-2019-0012632 | A | 2/2019 |
| WO | 2007/043412 | A1 | 4/2007 |

* cited by examiner

*Primary Examiner* — David P Porta
*Assistant Examiner* — Meenakshi S Sahu
(74) *Attorney, Agent, or Firm* — LRK PATENT LAW FIRM

(57) ABSTRACT

A micro focus X-ray tube is provided. The micro focus X-ray tube has a bonding structure in which a ceramic and a metal without an exhaust pipe are stacked by using a nano electric field emitter of an excellent feature.

16 Claims, 6 Drawing Sheets

MICRO FOCUS X-RAY TUBE USING NANO ELECTRIC FIELD EMITTER

CROSS-REFERENCE TO RELATED APPLICATION(S)

This application claims the priority benefit of Korean Patent Application No. 10-2022-0004632 filed on Jan. 12, 2022, and Korean Patent Application No. 10-2022-0128048 filed on Oct. 6, 2022, in the Korean Intellectual Property Office, the disclosures of which are incorporated herein by reference for all purposes.

BACKGROUND

1. Field of the Invention

One or more embodiments relate to a micro focus X-ray tube, and more particularly, to a device and method related to a micro focus X-ray tube having a structure in which heterogeneous materials are bonded together.

2. Description of Related Art

Generally, an X-ray imaging method may be an imaging method of precisely examining micro-structured elements and components without destruction. The X-ray imaging method may use a braking radiation X-ray generated when an electron beam that is focused in an extremely small size hits a metal anode target. In this case, a shadow image of an X-ray, which has passed through elements and components, may be magnified and obtained such that the internal micro-structure of the elements and components may be observed. When using a digital X-ray image detector, an appropriate process of magnifying an image is required because there is a limitation on reducing the size of a pixel.

In other words, the X-ray imaging method may magnify the shadow image as a distance between a digital X-ray image and an X-ray source increases, but an X-ray dose may decrease in inverse proportion to the square of the distance. Accordingly, a subject may as well be adjacent to an X-ray source, that is, a focal point of an electron beam of an anode target, to obtain a sufficient image magnification rate and a sufficient X-ray dose.

However, a voltage of the anode target is higher than that of a cathode electrode, which emits an electron beam, by tens to hundreds of kilovolts (kV). When a cathode is grounded, a voltage of an anode electrode may become a high voltage. Therefore, the subject may not be adjacent to the anode target because of insulation and other issues. Accordingly, a window structure may be needed for a negative power supply cathode structure to which the anode electrode is grounded or for an area the subject touches even when an anode is a positive power supply. An X-ray tube having the window structure is as illustrated in FIG. 1.

Specifically, a typical X-ray tube may have a window structure grounded to a positive power supply anode. A vacuum container may be made by bonding a glass tube and a metal electrode, a gas in the vacuum container may be exhausted through an exhaust pipe, and the vacuum container may be sealed to form the X-ray tube. In this case, a metal head may be coupled to a metal ring that is melted and fused to a glass bulb, and each electrode of an electron gun may be connected to the outside of the X-ray tube through a stem structure that is melted and fused to a glass. In this case, when using a nano electric field emitter as an electron source of the electron gun, a vacuum X-ray tube in a glass tube insulation structure may not ensure a quality feature.

SUMMARY

An aspect provides a structure of a micro focus X-ray tube having a nano electric field emitter implemented in a method of stacking a ceramic insulator and a metal electrode.

Another aspect also provides a structure of a micro focus X-ray tube that is bonded in a high temperature through vacuum brazing by using a ceramic insulator directly without an exhaust pipe.

Another aspect also provides a structure of a micro focus X-ray tube for minimizing a distance between a subject and a position of a target generating an X-ray by using a positive electrode anode and an electrode of a window that is grounded to a head of a micro focus X-ray.

According to an aspect, a micro focus X-ray tube includes a head of which the material is metal; a ceramic insulation tube bonded in a high temperature to a surface of the head; an electron gun bonded to a side surface of the head and comprising a nano electric field emitter; an anode in an inner space formed by the head and the ceramic insulation tube that are bonded in a high temperature; and a plate-shaped target included by the anode.

The head may be grounded to a sheet-shaped window, in which the sheet-shaped window emits, to the outside of the micro focus X-ray tube, an X-ray generated by an electron beam emitted from the electron gun.

The head may be in an insertion tube structure including an intaglio groove in a surface of the head, in which the insertion tube structure is inserted inside the ceramic insulation tube and spaced apart from the ceramic insulation tube by an insulation tube alignment guide.

The head may be bonded to an insulation ceramic of the electron gun through an electron gun bonding ring, in which a position of the electron gun is aligned by an electron gun guide on a side surface of the head.

The ceramic insulation tube may be bonded to the anode through an anode connection ring, in which a position of the ceramic insulation tube is aligned by an insulation guide on the anode connection ring.

The electron gun may include a cathode electrode coupled to a cathode plate including the nano electric field emitter; a gate electrode coupled to a gate plate; and a focus electrode coupled to a focus plate.

The gate plate may include a gate aperture configured to withdraw an electron from the nano electric field emitter and the focus plate may include a focus aperture configured to focus an electron beam emitted by accelerating the electron.

The plate-shaped target may be bonded by the anode and a vacuum brazing filler, in which the anode may include an intaglio groove such that a bonding area may be less than an area of the target.

According to another aspect, a micro focus X-ray tube includes a head bonded to an electron gun including a nano electric field emitter; a ceramic insulation tube bonded in a high temperature to the head; and an anode bonded to the ceramic insulation tube and including a plate-shaped target.

The head may include a window configured to emit, to the outside of the micro focus X-ray tube, an electron beam emitted from an electron gun; a diffusion barrier groove for minimizing a brazing filler in a process of grounding the head to the window; and a ring cover along the diffusion barrier groove.

The head may be in an insertion tube structure in which some of the head is inserted inside the ceramic insulation tube.

The head may be bonded to an insulation ceramic of the electron gun through an electron gun bonding ring to a side surface of the head, in which a position of the electron gun is aligned by an electron gun guide on a side surface of the head.

The ceramic insulation tube may be bonded to the anode through an anode connection ring, in which a position of the ceramic insulation tube is aligned by an insulation guide on the anode connection ring.

The electron gun may include a cathode electrode coupled to a cathode plate including the nano electric field emitter; a gate electrode coupled to a gate plate; and a focus electrode coupled to a focus plate.

The gate plate may include a gate aperture configured to withdraw an electron from the nano electric field emitter and the focus plate may include a focus aperture configured to focus an electron beam emitted by accelerating the electron.

The anode may include an intaglio groove, through which the plate-shaped target is included by the anode, such that a bonding area may be less than an area of the target.

According to another aspect, a micro focus X-ray tube may include a nano electric field emitter implemented in a method of stacking a ceramic insulator and a metal electrode.

According to another aspect, a micro focus X-ray tube may be bonded in a high temperature through vacuum brazing by using a ceramic insulator directly without an exhaust pipe.

According to another aspect, a micro focus X-ray tube may minimize a distance between a subject and a position of a target generating an X-ray by using a positive electrode anode and an electrode of a window that is grounded to a head of a micro focus X-ray.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Hereinafter, embodiments are described in detail with reference to the accompanying drawings.

Figure 1:
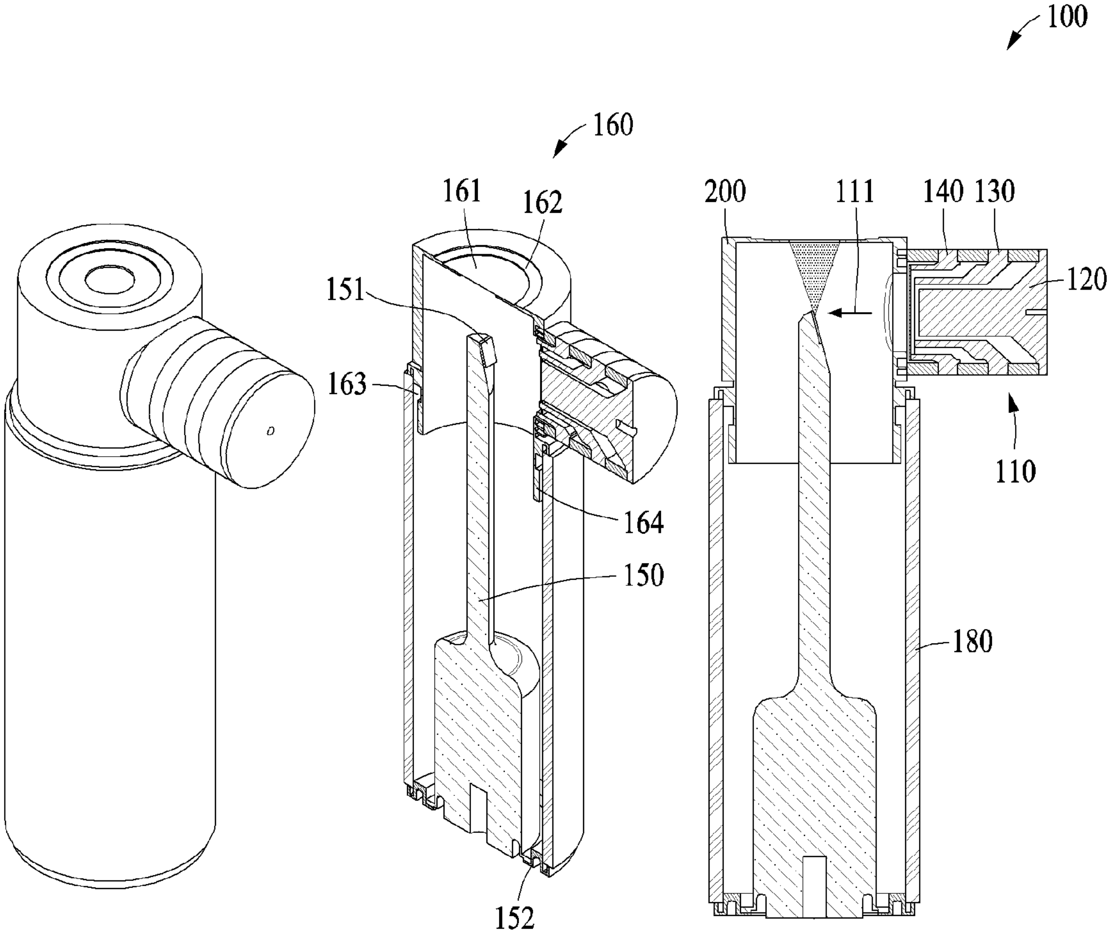
FIG. 1 is a diagram illustrating a micro focus X-ray tube according to an embodiment.
Figure 2A:
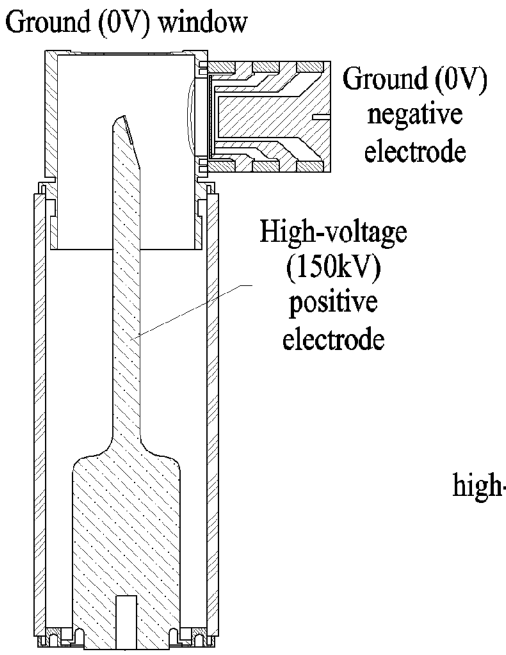
FIG. 2A is a diagram illustrating a voltage of each component of a micro focus X-ray tube, according to an embodiment.
Figure 2B:
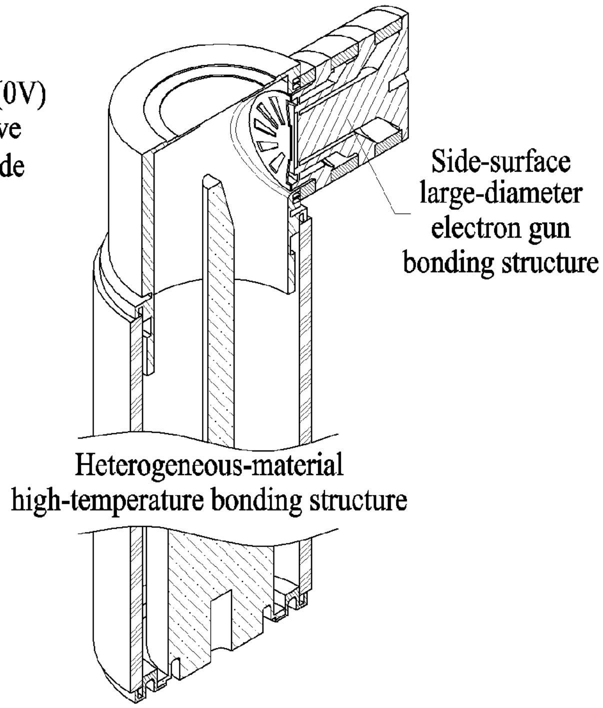
FIG. 2B is a diagram illustrating a bonding structure of a micro focus X-ray tube, according to an embodiment.
Figure 2C:
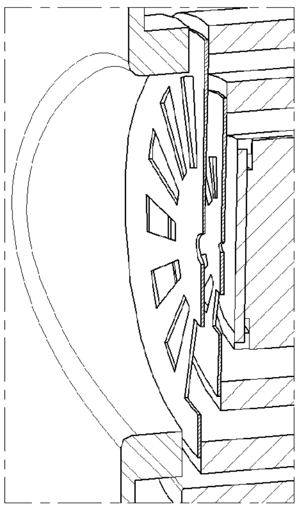
FIG. 2C is a diagram illustrating an electron gun according to an embodiment.
Figure 2D:
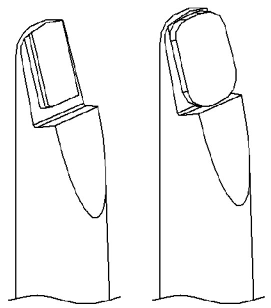
FIG. 2D is a diagram illustrating an anode and a target according to an embodiment.

FIG. 1 is a diagram illustrating a micro focus X-ray tube according to an embodiment.

Referring to FIG. 1, a micro focus X-ray tube 100 may include an anode 150, a head 160, and a ceramic insulation tube 180.

Specifically, the head 160 may include a metal material, and a surface of the head 160 may be bonded to a sheet-shaped window 161. For example, a sheet shape may be a thin plate. In this case, the head 160 may be bonded to the window 161 together with a ring-shaped sheet cover 162 to increase a brazing bonding yield of the head 160 thereto. An electron gun 110 including a nano electric field emitter (eg, nano electric field emitter 123 of FIG. 5) may be bonded to a side surface of the head 160. In this case, the window 161 may emit, to the outside of the micro focus X-ray tube 100, an X-ray 200 generated by an electron beam 111 emitted from the electron gun 110.

The ceramic insulation tube 180 may be bonded in a high temperature to another surface of the head 160. The ceramic insulation tube 180 may be bonded to the anode 150 through an anode connection ring 152. The position of the ceramic insulation tube 180 included by the micro focus X-ray tube 100 may be aligned by an insulation tube guide on the anode connection ring 152. The inner diameter of the ceramic insulation tube 180 and the outer diameter of the anode connection ring 152 may be spaced apart from each other, based on a thermal expansion coefficient difference, a processing error, and the like, and a spaced distance may be less than or equal to 0.2 millimeters (mm) based on a radius thereof. In this case, the anode 150 may be at the center of an inner space formed by the head 160 and the ceramic insulation tube 180 that are bonded in a high temperature.

To secure a withstand voltage, the anode 150 may be implemented in a bottleneck structure in which the width of the anode 150 is narrowed from a certain point. The anode 150 may be spaced apart from the ceramic insulation tube 180 in the inner space at a certain interval. A plate-shaped target 151 may be on a head of the anode 150. The head of the anode 150 may be inclined at a certain angle. Based on the certain angle, the plate-shaped target 151 may be brazing-bonded to the head of the anode 150.

In addition, the electron beam 111 emitted from the electron gun 110 may be accelerated by a voltage that is applied to the anode 150, and the X-ray 200 that is generated by the electron beam 111 and that reaches the plate-shaped target 151 may be emitted to the outside of the micro focus X-ray tube 100 through the window 161 of the head 160.

FIG. 2A to FIG. 2D are diagrams illustrating a bonding structure of a micro focus X-ray tube, according to an embodiment.

Referring to FIG. 2A to FIG. 2D, the micro focus X-ray tube 100 may not include a separate exhaust pipe for vacuum exhaust and may be manufactured as a vacuum sealed tube when brazing-bonding each component in a vacuum atmosphere. In addition, each junction may have a unique bonding structure to minimize stress caused by a thermal expansion coefficient difference between the ceramic insulation tube 180 and the head 160 that is of a metal material.

Specifically, the micro focus X-ray tube 100 may have a structure in which heterogeneous materials, such as a ceramic material of the ceramic insulation tube 180 and a metal material of the head 160, are bonded in a high temperature. The micro focus X-ray tube 100 may have a large diameter on a side surface of the head 160, and the electron gun 110 is bonded to the large diameter on the side surface of the head 160.

In addition, the micro focus X-ray tube 100 may include a high-voltage positive electrode anode inside the micro focus X-ray tube 100, and a cathode electrode 120 and the window 161 may respectively be on a side surface and an upper surface of the head 160. In the case of bipolar power driving, a positive voltage may be applied to the anode 150 and a negative voltage may be applied to the window 161 and a cathode.

Accordingly, the present disclosure may provide an improved micro focus X-ray tube 100 by using a method of direct vacuum brazing without an exhaust tube in a ceramic insulation structure in manufacturing a nano electric field emitter-based X-ray tube with an excellent feature.

Figure 3A:
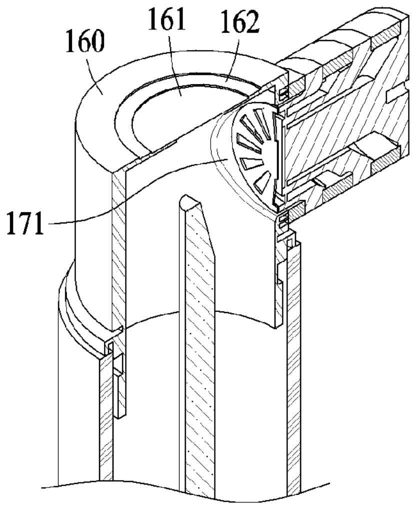
FIG. 3A is a diagram illustrating a head according to an embodiment.
Figure 3B:
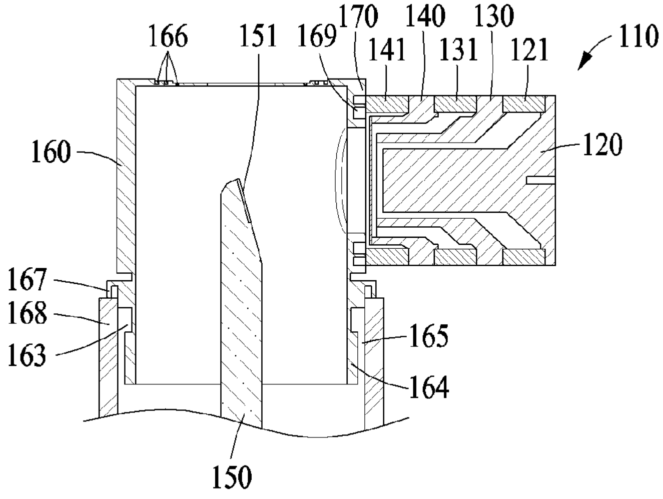
FIG. 3B is a diagram illustrating a head and an electron gun according to an embodiment.
Figure 3C:
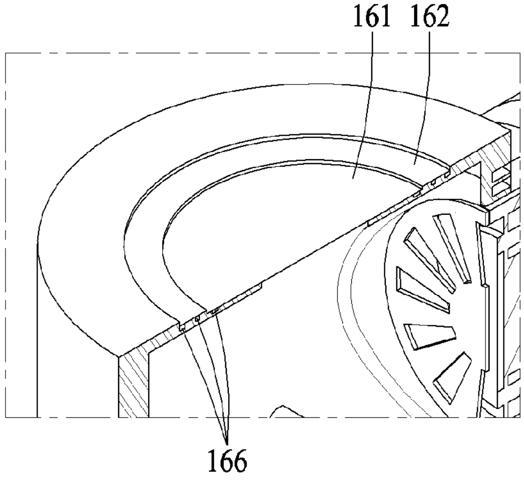
FIG. 3C is a magnified diagram illustrating a head according to an embodiment.

FIG. 3A to FIG. 3C are diagrams illustrating a head and an electron gun according to an embodiment.

Referring to FIG. 3A to FIG. 3C, the electron gun 110 including a nano electric field emitter may be on a side surface of the head 160. An electron gun bonding ring 169 of the head 160 may be brazing-bonded to a insulation ceramic tube 141 of the electron gun 110. The electron gun 110 may be aligned to the head 160 by an electron gun alignment guide 170 on the head 160. The electron gun 110 may include a cathode electrode 120 connected to an external power device (not shown), a gate electrode 130, and a focus electrode 140. In addition, the cathode electrode 120, the gate electrode 130, and the focus electrode 140 may be respectively insulated and bonded by insulation ceramic tubes 121, 131, and 141. The electron gun 110 are described in detail with reference to FIG. 5.

The window 161 may be grounded to a surface of the head 160. With respect to the window 161, the head 160 may further include a diffusion barrier groove 166 and the ring cover 162. The window 161 may emit, to the outside of the micro focus X-ray tube 100, an electron beam emitted from the electron gun 110. For example, the window 161 may be beryllium or thin metal, such as a copper material, of which the thickness is less than or equal to 50 micrometers (μm).

The diffusion barrier groove 166 may be in the head 160 to minimize a brazing filler in a process of grounding the window 161 to the head 160. The diffusion barrier groove 166 may be a concave, ring-shaped, and lengthy line recessed in the head 160. One or more diffusion barrier grooves 166 having different diameters may be in the head 160. The ring cover 162 may be on the head 160 along the diffusion barrier groove 166.

The diffusion barrier groove 166 and the ring cover 162 may adjust a bonding surface diffusion degree of a brazing filler and increase a bonding yield.

When bonded to the ceramic insulation tube 180, the head 160 may be brazing-bonded to an insulation tube bonding ring 167 on the head 160. The head 160 may be aligned with the ceramic insulation tube 180 by an insulation tube alignment guide 168. An insertion tube structure 164 including an intaglio groove 163 may be on the head 160. The inner diameter of the ceramic insulation tube 180 and the outer diameter of the head 160 may be spaced apart from each other, based on a thermal expansion coefficient difference, a processing error, and the like, and a space distance may be less than or equal to 0.2 mm based on a radius thereof.

In addition, the width and length forming the electron gun bonding ring 169 of the head 160 and the insulation tube bonding ring 167 of the head 160, to which heterogeneous materials are bonded, may respectively be 0.5 mm and 1.5 mm.

The insertion tube structure 164 may be inserted inside the ceramic insulation tube 180 and be spaced apart from the ceramic insulation tube 180 by the intaglio groove 163. For example, the insertion tube structure 164 may include the intaglio groove 163 to which a band-shaped non-volatile getter (not shown) may be mounted.

A space 165 may be formed between the head 160 and the ceramic insulation tube 180 by the intaglio groove 163. For example, the head 160 may include the insertion tube structure 164 inserted inside the ceramic insulation tube 180, and the space 165 apart from the ceramic insulation tube 180 may be formed by the insulation tube alignment guide 168.

Figure 4A:
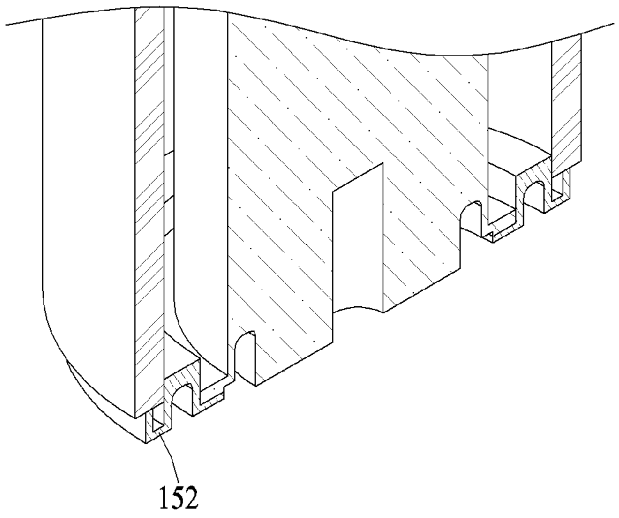
FIG. 4A is a diagram illustrating an anode connection ring at a lower end of a ceramic insulation tube, according to an embodiment.
Figure 4B:
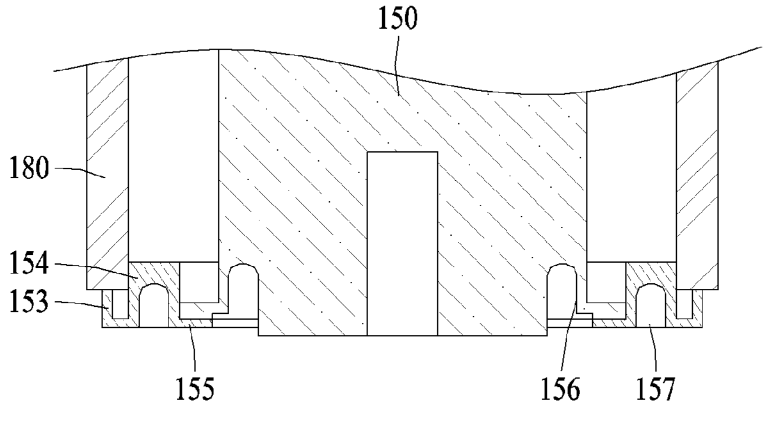
FIG. 4B is a diagram illustrating a bonding structure at a lower end of a ceramic insulation tube, according to an embodiment.

FIG. 4A to FIG. 4B are diagrams illustrating an anode, a ceramic insulation tube, and an anode connection ring according to an embodiment.

FIG. 4A to FIG. 4B illustrate a bonding structure among the anode 150, the ceramic insulation tube 180, and the anode connection ring 152. Specifically, the anode 150 may include a material, such as copper, with high thermal conductivity. The anode 150 may use the anode connection ring 152, of which the material is Kovar or the like, to overcome a thermal expansion coefficient difference.

Each junction of the anode 150 and the ceramic insulation tube 180 may minimize stress caused by a thermal expansion coefficient difference by using the anode connection ring 152 having thin bonding ring structures 153, 156, and 157.

The anode 150 and the anode connection ring 152 may be brazing-bonded to a bonding point 155, and the ceramic insulation tube 180 may be bonded by the bonding ring structure 153 and a position of the ceramic insulation tube 180 may be aligned by an insulation tube guide 154.

Figure 5:
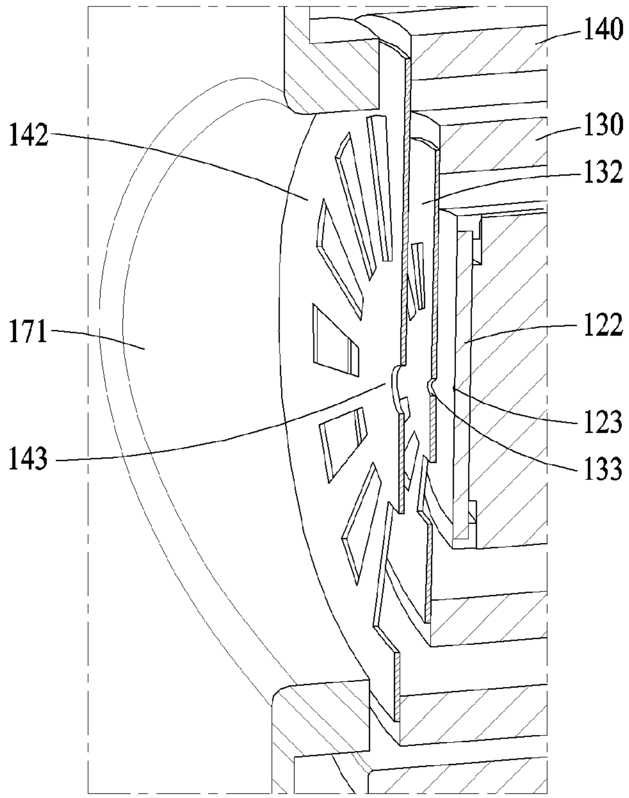
FIG. 5 is a diagram illustrating a detailed structure of an electron gun, according to an embodiment.

FIG. 5 is a diagram illustrating a detailed structure of an electron gun, according to an embodiment.

Referring to FIG. 5, the electron gun 110 may include a cathode plate 122 including the nano electric field emitter 123, a gate plate 132, and a focus plate 142. In this case, the cathode plate 122 may include a cathode electrode, the gate plate 132 may include the gate electrode 130, and the focus plate 142 may include a focus electrode.

In addition, the gate plate 132 may include a gate aperture 133 to withdraw an electron from the nano electric field emitter 123. The focus plate 142 may include a focus aperture 143 to focus the electron beam 111 emitted by accelerating the electron.

The cathode plate 122, the gate plate 132, and the focus plate 142 may respectively be electrically connected and bonded to the cathode electrode 120, the gate electrode 130, and the focus electrode 140. The cathode electrode 120, the gate electrode 130, the focus electrode 140, and the head 160 may be insulated by the insulation ceramic tubes 121, 131, and 141 and bonded.

The cathode electrode 120, the gate electrode 130, and the focus electrode 140 may each be connected to an external power device. The size of the nano electric field emitter 123, a distance between the cathode plate 122, the gate plate 132, the focus plate 142, and the head 160, and the sizes of the gate aperture 133, the focus aperture 143, and a head aperture 171 may be optimized to focus an optimal electron beam 111.

Figure 6:
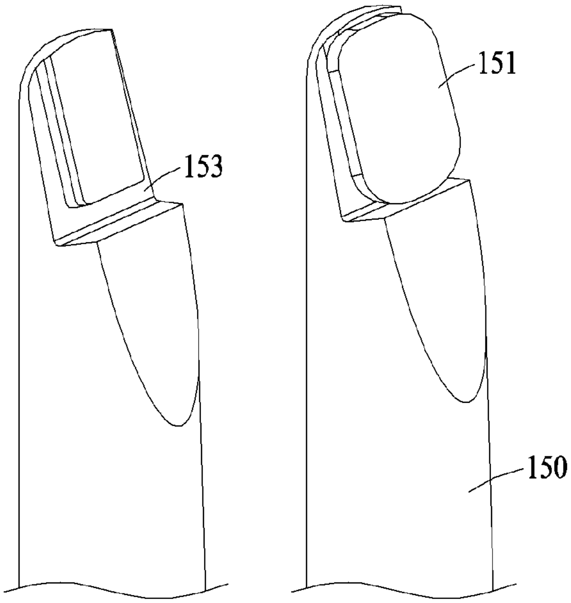
FIG. 6 is a diagram illustrating an anode and a target according to an embodiment.

FIG. 6 is a diagram illustrating an anode and a target according to an embodiment.

Referring to FIG. 6, the anode 150 and the plate-shaped target 151 may be bonded together in various ways. In this case, the anode 150 may form an intaglio groove 163 such that the area of a target may be less than a bonding area to prevent a filler from overflowing when bonded by using a brazing filler.

The method according to example embodiments may be written in a computer-executable program and may be implemented as various recording media, such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the to aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A micro focus X-ray tube comprising:
- a head of which the material is metal;
- a ceramic insulation tube bonded in a high temperature to a surface of the head;
- an electron gun bonded to a side surface of the head and comprising a nano electric field emitter;
- an anode in an inner space formed by the head and the ceramic insulation tube that are bonded in a high temperature; and
- a plate-shaped target comprised by the anode.

2. The micro focus X-ray tube of claim 1, wherein the head is grounded to a sheet-shaped window, wherein the sheet-shaped window is configured to emit, to the outside of the micro focus X-ray tube, an X-ray generated by an electron beam emitted from the electron gun.

3. The micro focus X-ray tube of claim 1, wherein the head is in an insertion tube structure comprising an intaglio groove in a surface of the head, wherein the insertion tube structure is inserted inside the ceramic insulation tube and spaced apart from the ceramic insulation tube by an insulation tube alignment guide.

4. The micro focus X-ray tube of claim 1, wherein the head is bonded to an insulation ceramic of the electron gun through an electron gun bonding ring, wherein a position of the electron gun is aligned by an electron gun guide on a side surface of the head.

5. The micro focus X-ray tube of claim 1, wherein the ceramic insulation tube is bonded to the anode through an anode connection ring, wherein a position of the ceramic insulation tube is aligned by an insulation guide on the anode connection ring.

6. The micro focus X-ray tube of claim 1, wherein the electron gun comprises:

a cathode electrode coupled to a cathode plate comprising the nano electric field emitter;

a gate electrode coupled to a gate plate; and a focus electrode coupled to a focus plate.

7. The micro focus X-ray tube of claim 6, wherein:

the gate plate comprises a gate aperture configured to withdraw an electron from the nano electric field emitter, and the focus plate comprises a focus aperture configured to focus an electron beam emitted by accelerating the electron.

8. The micro focus X-ray tube of claim 1, wherein the plate-shaped target is bonded by the anode and a vacuum brazing filler, wherein the anode comprises an intaglio groove such that a bonding area is less than an area of the plate-shaped target.

9. A micro focus X-ray tube comprising:

a head bonded to an electron gun comprising a nano electric field emitter;

a ceramic insulation tube bonded in a high temperature to the head; and an anode bonded to the ceramic insulation tube and comprising a plate-shaped target.

10. The micro focus X-ray tube of claim 9, wherein the head comprises:

a window configured to emit, to the outside of the micro focus X-ray tube, an electron beam emitted from an electron gun;

a diffusion barrier groove for minimizing a brazing filler in a process of grounding the head to the window; and a ring cover along the diffusion barrier groove.

11. The micro focus X-ray tube of claim 9, wherein the head is in an insertion tube structure in which some of the head is inserted inside the ceramic insulation tube.

12. The micro focus X-ray tube of claim 9, wherein the head is bonded to an insulation ceramic of the electron gun through an electron gun bonding ring to a side surface of the head, wherein a position of the electron gun is aligned by an electron gun guide on a side surface of the head.

13. The micro focus X-ray tube of claim 9, wherein the ceramic insulation tube is bonded to the anode through an anode connection ring, wherein a position of the ceramic insulation tube is aligned by an insulation guide on the anode connection ring.

14. The micro focus X-ray tube of claim 9, wherein the electron gun comprises:

a cathode electrode coupled to a cathode plate comprising the nano electric field emitter;

a gate electrode coupled to a gate plate; and a focus electrode coupled to a focus plate.

15. The micro focus X-ray tube of claim 14, wherein:

the gate plate comprises a gate aperture configured to withdraw an electron from the nano electric field emitter, and the focus plate comprises a focus aperture configured to focus an electron beam emitted by accelerating the electron.

16. The micro focus X-ray tube of claim 9, wherein the anode comprises an intaglio groove, through which the plate-shaped target is comprised by the anode, such that a bonding area is less than an area of the plate-shaped target.

* * * * *